United States Patent [19]

Kobayashi et al.

[11] Patent Number: 5,124,303
[45] Date of Patent: Jun. 23, 1992

[54] REINFORCED CATALYST FOR TREATMENT OF WASTE GAS

[75] Inventors: Motonobu Kobayashi; Futoru Kinoshita, both of Hyogo, Japan

[73] Assignee: Nippon Shokubai Co., Ltd., Osaka, Japan

[21] Appl. No.: 749,671

[22] Filed: Aug. 26, 1991

[30] Foreign Application Priority Data

Aug. 27, 1990 [JP] Japan .................. 2-222570

[51] Int. Cl.$^5$ .................. B01J 21/06; B01J 21/08; B01J 23/30
[52] U.S. Cl. .................. 502/241; 502/242; 502/304; 502/309; 502/324; 502/345; 502/350; 502/527; 423/239
[58] Field of Search .................. 502/241, 242, 304, 309, 502/324, 345, 350, 527

[56] References Cited

U.S. PATENT DOCUMENTS 4,294,806 10/1981 Abe et al. .................. 502/527 X
4,637,995 1/1987 DeAngelis et al. .......... 502/527 X

*Primary Examiner*—Patrick P. Garvin
*Attorney, Agent, or Firm*—Omri M. Behr

[57] ABSTRACT

A waste gas-treating catalyst produced by coating the gas inlet side leasing end part of an integrally formed titanium-containing porous nitrogen oxide removing catalyst with at least one sol selected from the group consisting of zirconia sol and zirconium silicate sol, drying and/or calcining the coated catalyst.

25 Claims, No Drawings

REINFORCED CATALYST FOR TREATMENT OF WASTE GAS

BACKGROUND OF THE INVENTION

1. Field of the Invention

This invention relates to a waste gas-treating catalyst for the removal of nitrogen oxides (NOx) from waste gas and more particularly to a waste gas-treating catalyst exhibiting notably improved frictional strength to the dust in the waste gas without a sacrifice of the removal activity of nitrogen oxides

2. Description of the Prior Art

Generally, the waste gases emanating from the boilers consuming heavy oil or coal as a fuel and the waste gases released from cement plants and sintering furnaces contain sulfur oxides (SOx). The catalysts which are used for the treatment of these waste gases, therefore, are required to be capable of withstanding the action of the SOx in addition to removing the NOx. From this point of view, it is generally held that titania type catalysts have a hopeful future.

In the case of the titania type catalysts, a catalyst of strength just fitting the application for which the catalyst is intended can be obtained by preparatorily molding a carrier material in a desired shape, sintering the molded material at an elevated temperature thereby forming a carrier, and depositing a catalytically active substance on the carrier as by coating or impregnation. The catalyst which is obtained by this method, however, suffers extreme smallness of both surface area and pore volume and encounters great difficulty in manifesting a high catalytic activity at low temperatures.

A highly active titania type catalyst enjoying largeness of both surface area and pore volume and manifesting high quality even at low temperatures at a high special velocity is preferable to be a molded catalyst. The molded catalyst, however, suffers smallness of strength and vulnerability of the gas-contact surface thereof to abrasion. When this catalyst is used for the purpose of treating a waste gas which contains dust copiously, the contact surface thereof is worn possibly to the extent of degrading the efficiency of treatment of waste gas and the powder consequently shed from the contact surface is discharged out of the system as entrained by the waste gas, with the possible result that the powder will induce secondary air pollution and clog the catalyst bed.

For the purpose of solving this problem encountered by the catalyst described above, a honeycomb type molded catalyst adapted to retain porosity throughout the entire volume thereof and endowed in the gas inlet side leading end thereof with improved wearproofness by means of sintering or vitreous coating has been proposed (U.S. Pat. No. 4,294,806).

This known catalyst indeed has an appreciably improved strength to withstand the wear caused by the dust in the waste gas. Since this molded catalyst has the inlet side leading end part thereof subjected to the impact of sintering or vitreous coating, however, it suffers loss of the catalytic activity, i.e. the removal activity of nitrogen oxides, in the affected part.

An object of this invention is, accordingly, to provide an improved catalyst to be used for the treatment of waste gas.

Another object of this invention is to provide a waste gas-treating catalyst having the wear-resisting strength thereof enhanced to a conspicuous extent without a sacrifice of the catalytic activity.

SUMMARY OF THE INVENTION

These objects are accomplished by an monolithically molded titanium-containing porous catalyst for removal of nitrogen oxides which has the gas inlet side leading end part thereof coated with at least one sol selected from the group consisting of zirconia sol and zirconium silicate sol and drying and /or calcining the coated catalyst and which is used for the treatment of waste gas.

We, as a result of our study, have learnt that the objects are attained by coating the gas inlet side leading end part of a catalyst with zirconia sol or zirconium silicate sol and drying and/or calcining the coated catalyst. This invention has been perfected on the basis of this knowledge.

Since the catalyst of this invention has the gas inlet side leading end part thereof coated with zirconia sol or zirconium silicate sol, it acquires conspicuously improved wear-resisting strength without entailing any decline of the catalytic activity To be specific, the catalyst of this invention exhibits outstanding wearproofness to the dust in waste gas and, at the same time, manifests the same degree of catalytic activity as the catalyst before the coating.

The catalyst of this invention, therefore, is highly useful for the treatment of waste gas.

EXPLANATION OF THE PREFERRED EMBODIMENT

Now, the present invention will be described in detail below.

The monolithically molded titanium-containing porous removal catalyst for nitrogen oxides to be used in the present invention (hereinafter referred to as "monolithically constructed catalyst") may be any conventional catalyst which contains a titanium oxide and an oxide of at least one element selected from the group consisting of vanadium tungsten and molybdenum as a catalylic substance and can be prepared by the known method. The raw materials and the method of molding to be adopted for the preparation are not particularly restricted. The preparation can be attained, for example, by using titanyl sulfate as a titanium source, mixing the sulfuric acid solution of titanyl sulfate and silica sol thereby forming a coprecipitated gel, calcining this gel and consequently yielding a $TiO_2$-$SiO_2$ powder, mixing this powder with a suitable amount of water and a starting material of a catalytic substance such as a vanadium compound, a tungsten compound, a molybdenum compound, etc. by means of a kneader, kneading the resultant mixture, and molding the blend by the use of an extrusion molding device, crying and calcining the molded catalyst. Alternatively, it can be attained by molding the $TiO_2$-SiO powder to a monolithic structure, drying and calcining the monolithic structure, then impregnating the structure a starting material of the above-mentioned catalytically active substance to be supported and drying and calcining it to obtian a complete catalyst. Of course, the silica sol may be substituted with a suitable equivalent and the raw materials mentioned above may include a component useful for the purpose of improving the catalytic activity and a molding auxiliary when necessary.

Among these catalysts, the following monolithically structural catalyst especially exhibits seperior effect as removal catalyst fox nitrogen oxides. The catalytically active substance of the catalyst comprises (A) 60 to 99.5% by weight of a binary oxide containing titanium and silicon (hereinafter referred to briefly as "TiO$_2$-SiO$_2$") and (B) 40 to 0.5% by weight of the oxide of at least one metal selected from the group consisting of vanadium, tungsten, molybdenum, coper, manganese, cerium, and tin.

In the composition of TiO$_2$-SiO$_2$ as the component (A), titanium is preferable to account for a proportion in the range of 40 to 95% and silicon for a proportion in the range of 60 to 5%, respectively in the atomic percentage. If the proportion of titanium is less than 40%, the nitrogen removal activity of the catalyst is unduly low. If the proportion exceeds 95%, the oxidizing activity of SO$_2$ is unduly high.

The component (B) is the oxide of at least one metal selected from the group consisting of vanadium, tungsten, molybdenum, copper, manganese, derium, and tin.

The proportion of the component (A) is in the range of 60 to 99.5% by weight, preferably 80 to 99% by weight, and the proportion of (B) is in the range of 40 to 0.5% by weight, preferable 20 to 1% by weight. If the proportion of the component (A) is less than 60% by weight, the cost of raw materials for the catalyst is high and the denitrifying activity cannot be expected to be proportionately increased. Conversely, if this proportion exceeds 99.5% by weight, the undesirability arises that the denitrifying activity is unduly low.

The method for the preparation of the monolithically structural catalyst of this invention is not specifically defined. This honeycomb catalyst can be prepared by various methods. Now, a typical method of preparation will be described below. It should be noted, however, that this invention is not limited to this method.

In the preparation of TiO$_2$-SiO$_2$ as the component (A), at least one compound selected from the group consisting of inorganic titanium compounds such as titanium chloride and titanium sulfate and organic titanium compounds such as titanium oxalate and tetraisopropyl titanate can be used as a titanium source and at least one compound selected from the group consisting of inorganic silicon compounds as colloidal silica, finely powered silicic acid, water glass, and silicon tetrachloride and organic silicon compounds such as tetraethyl silicate as a silicon source.

The aforementioned compounds as the titanium source and the silicon source are weighed out in amounts such that the atomic percentages of titanium and silicon fall respectively in the ranges of 40 to 95% and 60 to 5% and they are retained in the state of an acidic aqueous solution or a sol in a concentration in the range of 1 to 100 g/liter, preferably 5 to 80 g/liter, as oxides at a temperature in the range of 10° to 100° C., preferably 10° to 50° C. The mixture of the compounds is stirred and aqua ammonia is added dropwise thereto as a neutralizing agent to give rise to a coprecipitated compound. The coprecipitated compound is separated by filtration, thoroughly washed, then dried by heating at a temperature in the range of 80° to 140° C., preferably 100° to 120° C., for a period in the range of to 10 hours, preferably 5 to 10 hours, and further calcined at a temperature in the range of 450° to 700° C., preferably 500° to 650° C., for a period in the range of 1 to 10 hours, preferably 3 to 10 hours, to obtain TiO$_2$-SiO$_2$.

In the preparation of the oxide of at least one metal selected from the group consisting of vanadium, tungsten, molybdenum, copper, manganese, cerium, and tin as the component (B), the starting material may be suitably selected from among oxides, hydroxides, ammonium salts, oxalates, and halides of the metals mentioned above. Specifically, the vanadium sources which are usable herein include ammonium metavanadate, vanadyl sulfate, vanadyl oxalate, and vanadium oxide and the tungsten sources which are usable herein include tungsten oxide, ammonium paratungstate, and tungstic acid, for example.

The aforementioned component (A) and the aqueous solution of a starting material for the component (B) added thereto in conjunction with a molding auxiliary are mixed, kneaded, and molded in the form of a honeycomb with an extrusion molding device. From the molded product, a honeycomb catalyst of the present invention is obtained by drying the molded product at a temperature in the range of 50° to 120° C., preferably 50° to 100° C., and then calcining the dried product in the air at a temperature in the range of 450° to 700° C., preferably 500° to 650° C., for a period in the range of 1 to 10 hours, preferably 2 to 6 hours.

The specific surface area (BET surface area) of the honeycomb catalyst of the present invention is preferable to be not less than 80 m$^2$/g, preferably in the range of 80 to 250 m$^2$/g.

The opening ratio in the cross section (cross section perpendicular to the through holes) of the honeycomb catalyst of the present invention is preferable to be in the range of 50 to 90%, preferably 60 to 85%.

The thickness of the partition walls separating the through holes in the honeycomb catalyst of this invention is in the range of 0.3 to 2.0 mm, preferably 0.4 to 1.6 mm. If this thickness is less than 0.2 mm, the strength is unduly low. Conversely, if the thickness exceeds 0.8 mm, the undesirability arises that the pressure loss is unduly large.

The through holes in the honeycomb catalyst of this invention have diameters in the range of 3 to 10 mm, preferably 4 to 8 mm.

The zirconia sol and zirconium silicate sol to be used in the present invention may be any sol in the form of sol and although any sol can be used, it is preferably a sol having not more than 400 Å, more preferably not more than 200 Å, especially 20 to 200 Å of average particle diameter. The monolithically structural catalyst has generally 0.01 to 0.1 μm of average pore diameter, but if the sol having the above mentioned range, the sol permeates into inner portion of the fine pores, so it thought that it contributes the enhancement of mechanical strength. If the average pore diameter exceeds 400 Å, permeation amount into the inner portion of the catalyst decreases and amount of the sol adhered to the surface of the catalyst increases, so although the mechanical strength is improved compared to a conventional enhancement of the terminal portion of the catalyst, extent thereof becomes inferior compared to the catalyst using the sol having not more than 400 Å of average particle diameter.

The above mentioned zirconia sol can be prepared by a method by neutralizing an aqueous zirconium salt solution with an alkali, by adding a basic substance into an aqueous zirconium solution until precipitation does not generate to form sol, and by a method by heating an aqueous solution containing a zirconium salt under normal or increased pressure.

Among these zirconia sol, an acidic zirconia sol and a neutral or basic zirconia sol are preferable, especially the neutral or basic zirconia sol is preferable The acidic zirconia sol may be (a) a transparent zirconia sol obtained by heating an aqueous solution of a zirconium salt in the presence of urea or a (b) concentrated zirconia sol obtained by concentrating the transparent zirconia sol by ultrafiltration or (c) a highly concentrated zirconia sol obtained by thermally concentrating the concentrated zirconia sol at a temperature of not exceeding 80° C. as disclosed in EP-A-0 413 033.

Now, the present invention will be described in detail below. First, a transparent zirconia sol is produced by adding urea to an aqueous solution of a zirconium salt selected from among such water-soluble zirconium salts as zirconium oxychloride, zirconium nitrate, zirconium sulfate, and zirconium acetate and heating the resultant mixture.

The heating temperature to be used in this reaction is in the range of 60° to 300° C. The amount of urea per mol of the zirconium salt is in the range of 0.2 to 4 mols, preferably 0.5 to 2 mols. This reaction is stopped while the sol consequently produced is in a state retaining transparency. If necessary, the sol is cooled and then concentrated by the use of an ultrafilter membrane. The ions present in the sol are expelled from the system in conjunction with water. When the sol resulting from the concentration contains ions in a high concentration, the removal of the ions is effected by diluting the sol with purified water and then repeating the step of concentration on the diluted sol or treating the sol with an ion-exchange resin. The sol resulting from the concentration is further, if necessary, concentrated by a heat treatment. This concentration is effected by keeping the temperature of the sol below 80° C., preferably in the range of 5° to 60° C., and more preferably in the range of 10° to 40° C.

The transparent zirconia sol obtained as described above is capable of acquiring a concentration of up to 50% by weight as $ZrO_2$ and exhibiting lasting stability.

This transparent zirconia sol has an acidic hydrogen-ion activity, specifically a pH in the range of 0.1 to 6, and a viscosity in the range of 5 to 3,000 cp, though variable with the concentration or the pH.

A high-quality zirconia sol is obtained by preparing a transparent highly concentrated zirconia sol by the method described above and incorporating in this zirconia sol a chelating agent and/or a compound of a metal other than zirconium (hereinafter referred to as "other metal compound").

The chelating agents which are advantageously used herein include oxyphenols such as catechol and pyrogallol, amino alcohols such as diethanol amine and triethanol amine, oxyacids such as glycolic acid, lactic acid, and hydroxyacrylic acid and methyl, ethyl, hydroxyethyl, and other similar esters of such acids, oxyaldehydes such as glycol aldehyde, amino acids such as glycine and alanine, β-diketones such as acetyl acetone, benzoyl acetone, stearoyl acetone, stearoyl benzoyl methane, and dibenzoyl methane, and β-ketonic acids such as acetoacetic acid, propionyl acetic acid, and benzoyl acetic acid and methyl, ethyl, n-propyl, i-propyl, n-butyl, t-butyl, and other similar esters of such acids, for example. Among other chelating agents mentioned above, β-dicarbonyl compounds such as β-diketones, β-ketonic acids, and esters thereof prove to be particularly desirable.

The amount of the chelating agent to be added may be relatively small. The chelating agent added in an amount in the range of 0.02 to 1 mol, preferably 0.05 to 0.8 mol, per mol of zirconia in the sol manifests the expected effect fully satisfactorily. The addition of the chelating agent in an amount exceeding 1 mol per mol of the zirconia is not economical because the addition to the effect of the chelating agent is not increased proportionately. The other metal compounds which can be used in this invention include aluminum, yttrium, calcium, magnesium, titanium, tin, indium, cerium, and silicon, for example. These metallic element compounds may be used either singly or in the form of a combination of two or more members, depending on the purpose for which the sol is used. In these metallic element compounds, the compounds of yttrium, calcium, or magnesium are important with respect to the purpose of use of the sol of the present invention. Generally, such a metallic element compound is used in an amount in the range of 0.5 to 20 mol%, preferably 1 to 18 mol%, as an oxide based on the amount of zirconia.

The time and the method for the addition of the chelating agent and the metallic element compound are not specifically limited. They may be added at any desired time between the time the transparent zirconic sol has not yet been formed and the time it has been formed. The addition may be made, for example, (1) after the transparent zirconic sol is formed by heating the aqueous solution of a zirconium salt and urea, (2) after the transparent zirconic sol is concentrated with an ultrafilter membrane, or (3) after the transparent zirconic sol is concentrated with an ultrafilter membrane and then heated. Otherwise, the addition may be made (4) into the mixed solution of the aqueous solution of a zirconia salt and urea. No leakage of the chelating agent from the system is recognized even when the reaction for the formation of a sol is carried out after the addition of the chelating agent and the formed sol is concentrated with an ultrafilter membrane as in the case of (4). Since the reactant components can be uniformly mixed before the reaction for the formation of a sol, the zirconia type sol consequently produced enjoys high homogeneity and high quality. It is further possible to produce a sol consisting of particles having zirconia complexed with other reactant components. There are times (5) when the content of the chelating agent is required to be small by reason of the purpose of use of the produced sol. In this case, the chelating agent alone may be added in an amount commensurate with the time required for the purpose of stabilization and the metallic element compound may be added to and mixed with the sol immediately before the sol is put to use.

The neutral or basic zirconia sol may be (a) a zirconia sol incorporating a chelating agent to a transparent zirconia sol obtained by hydrolizing ammonium airconyl carbonate, (b) a zirconia sol obtained by hydrolizing a reaction product of ammonium zirconyl carbonate with a chelating agent, or (c) a zirconia sol dispersed in an organic solvent by adding the orgenic sol into a water-dispersed zirconia to substitute water with the organic solvent as disclosed in EP-A-0 409 282.

For the preparation of a zirconia sol of the present invention form zirconyl ammonium carbonate, (1) the method which comprises hydrolyzing the aqueous solution of zirconyl ammonium carbonate, separating zirconia sol particles from the hydrolyzate by the use of an ultrafiltration membrane, and washing the separated zirconia sol particles, (2) the method which comprises causing zirconyl ammonium carbonate with a chelating agent and hydrolyzing the resultant reaction product thereby heightening the conversion of zirconyl ammonium carbonate substantially to 100%, etc. are available.

Now, these methods will be described further in detail below.

(1) Method Resorting to Hydrolysis of Aqueous Solution of Zirconyl Ammonium Carbonate In the hydrolysis of the aqueous solution of zirconyl ammonium carbonate, since the reaction solution induces the phenoma of increase of viscosity and gelation in consequence of the advance of the reaction, it is necessary to keep the concentration of zirconyl ammonium carbonate at a relatively low level and bring the reaction to termination in a short span of time Properly, the concentration of the aqueous solution of zirconyl ammonium carbonate in the present invention is approximately in the range of 0.05 to 1 mol/liter, preferably 0.1 to 0.5 mol/liter. If this concentration is unduly low, the method is not economical. Conversely, if the concentration is unduly high, there arises the disadvantage that the phenomena of increase of viscosity and gelation of the reaction solution are rapidly induced during the course of the reaction.

The zirconyl ammonium carbonate is heated to a temperature exceeding 60° C. to be hydrolyzed. If the reaction is continued for a long time, the sol particles formed in the reaction solution are polycondensed to the extent of pacifying the reaction solution and giving rise to a precipitate therein. To ensure production of a transparent zirconia sol of this invention, it is necessary to terminate the reaction while the reaction solution retains transparency. In the present invention, the reaction temperature is set in the range of 60° to 120° C., preferably 80° to 120° C., and the reaction time in the range of 0.01 to 2 hour, preferably 0.03 to 1 hour. As regards the form of reaction, though the reaction may be carried out batchwise as generally practiced, it is properly performed by the flow method in which the retention time of the product and other reaction conditions are uniform. The reaction vessel to be used may be in the form of a tank or a tube.

The reaction solution obtained by the hydrolysis described above is cooled rapidly, treated with an ultrafiltration membrane, and washed to remove the unaltered zirconyl ammonium carbonate and ions formed by the reaction and obtain a zirconia sol of high concentration.

The impurities in the sol are expelled together with water from the system. The concentrated sol is continuously washed by addition of pure water. During the course of this washing, the sol concentration is preferable to be retained in the range of 1 to 15% by weight. By selecting the permeating pore structure in the ultrafiltration membrane, the washing and concentration of the sol can be attained without substantial loss of sol particles. After the washing, the sol is concentrated approximately to a level in the range of 5 to 20% by weight as zirconia. If it is concentrated to a level exceeding the upper limit, there is the possibility that the sol will gain in viscosity or undergo gelation and clog the permeating pores in the ultrafiltration membrane.

The zirconia sol washed and concentrated by the use of the ultrafiltration membrane can be further concentrated by heating. Since the zirconia sol tends to lose stability and gain in susceptibility to gelation in accordance as it gains in concentration, and when further Concentration i.e., washing by using ultrafiltration membrane, concentration, and concentration by heating is carried out, it is preferable to be carried out in the presence of a chelating agent. This heating for the further concentration is performed at a temperature not exceeding 80° C., desirably not exceeding 60° C., and more desirably not exceeding 40° C. The further concentration by this heating can be effected efficiently by keeping the sol stirred under a vacuum. By this heating, the concentration of the zirconia sol can be increased approximately to a level of 30% by weight.

The chelating agents which can be effectively used in the present invention include oxyphenols such as catechol and pyrogallol; amino alcohols such as diethanol amine and triethanol amine; oxyacids such as glycolic acid, citric acid, tartaric acid, lactic acid, mandelic acid, malic acid, and hydroxyacrylic acid; methyl, ethyl, hydroxyethyl, and other similar esters of the oxyacids; oxyaldehydes such as glycol aldehyde; polycarboxylic acids such as oxalic acid and malonic acid; amino acids such as glycine and alanine; $\beta$-diketones such as acetyl acetone, stearoyl acetone, stearoyl benzoyl methane, and dibenzoyl methane and $\beta$-ketonic acids such as acetoacetic acid, propionyl acetic acid, and benzoyl acetic acid and methyl, ethyl, n-propyl, isopropyl, n-butyl, t-butyl and other similar esters of such $\beta$-diketones and $\beta$-ketonic acids, for example. One member or a combination of two or more members selected from the group of chelating agents mentioned above can be used. Among other chelating agents enumerated above, oxyacids such as glycolic acid, citric acid, tartaric acid, lactic acid, mandelic acid, malic acid, and hydroxyacrylic acid and $\beta$-diketones such as acetyl acetone prove to be particularly desirable. Still more desirable chelating agents are alpha, beta, and gamma-oxyacids. To be specific, they are alpha-, beta-, and gamma-ketonic acids possessing functional groups containing an oxygen atom on the carbon of alpha, beta, and the esters of such keton acids.

The amount of the chelating agent to be used, though variable with the kind of chelating agent, is preferable to be such that the chelating agent (mol number)/zirconia (mol number) falls in the range of 0.02/1 to 4/1, preferably 0.1/1 to 3/1, and more preferably 0.5/1 to 2/1.

If this ratio is unduly small the effect of the addition of this chelating agent is absent. Conversely, if the ratio exceeds 4/1, the use of the chelating agent is uneconomical because the effect is not proportionately increased.

The incorporation of the chelating agent is effective in stabilizing the concentration by heating of the zirconia sol described above and in stabilizing a zirconia type sol containing in zirconia sol the salt or sol of a metal other than zirconium as well. When zirconia sol contains the aforementioned metal seed of a metal other than zirconium, it is more often than devoid of stability to withstand aging even when the concentration of zirconia is low. A zirconia type sol stable to withstand aging can be easily prepared by combining a zirconia sol of relatively low concentration obtained after ultrafiltration with a chelating agent or by adding the metal seed of a metal other than zirconium to a highly concentrated zirconia sol obtained by thermally concentrating a zirconia sol containing a chelating agent. The metal seeds other than zirconium which can be added in the zirconia type sol include compounds of vanadium, niobium, tantalum, chromium, molybdenum, and tungsten which have a higher valaency than zirconium, titanium, tin, silicon, and cerium which have the same valency as zirconium, and aluminum, yttrium, indium, calcium, and magnesium which have a smaller valency than zirconium When one member or a mixture of two or more members selected from the group of metallic elements mentioned above is used in combination with zirconia, mechanical, electromagnetic, and optical functions may be imparted or enhance as compared with the sole use of zirconia.

(II) Method Resorting to Hydrolysis of Reaction Product of Zirconyl Ammonium Carbonate With Chelating Agent This method comprises mixing an aqueous solution of zirconyl ammonium carbonate with a chelating agent thereby transforming zirconyl ammonium carbonate temporarily into a zirconium-chelate compound, then thermally hydrolyzing the chelate compound, and subsequently optionally subjecting the resultant hydrolyzate to filtration and washing by the use of an ultrafiltration membrane. In the hydrolysis of the aqueous solution of zirconyl ammonium carbonate, the reaction solution induces increase of viscosity and gelation in a relatively short span of time when the reaction is continued and, consequently, the hydrolysis of zirconyl ammonium carbonate is attained only to a small extent. The present method is the fruit of a diligent study performed in search of a method capable of stably continuing the hydrolysis of zirconyl ammonium carbonate. This invention resides in a method for obtaining a zirconia sol, which comprise mixing an aqueous solution of zirconyl ammonium carbonate with a chelating agent thereby preparatorily forming the reaction product of zirconyl ammonium carbonate and the chelating agent and then heating the aqueous solution containing the reaction product to a temperature exceeding 60° C. Specifically, when an aqueous solution of zirconyl ammonium carbonate is placed in a stirring tank type reaction vessel and a chelating agent is added to the aqueous solution kept stirred therein, the zirconyl ammonium carbonate rapidly reacts with the chelating agent at room temperature.

When the resultant reaction solution is heated to a temperature above 60° C., the reaction product of zirconyl ammonium carbonate with the chelating agent is hydrolyzed with evolution of a gas formed mainly of carbon dioxide and ammonia. During the course of the hydrolysis, the reaction solution does not gain in viscosity but retains transparency until the reaction is completed. After the reaction, the reaction solution exhibits a weakly alkaline to neutral pH value. When an alkaline substance is added to this reaction solution, the reaction solution does not induce such phenoma as increase of viscosity and gelation. Since the zirconyl ammonium carbonate is substantially completely decomposed during the corse of the hydrolsys, the reaction solution contains substantially no unaltered zirconyl ammonium carbonate. The reaction solution contains impurities only in very low concentrations because such unwanted ions as ammonium ion and carbonic acid ion are gassfied and expelled from the system during the course of the reaction. This reaction, therefore, is used as the zirconia sol aimed at by the present invention. The impurities persisting, though in small amounts, in the reaction solution can be efficiently removed by a method similar to the aforementioned method of filtration and washing by the use of an ultrafiltration membrane. Thus, the zirconia sol can be obtained with still higher purity.

The zirconyl ammonium carbonate and the chelating agent to be used in the present method are identical to those which are used in the method of (1) which resorts to hydrolysis of an aqueous solution of zirconyl ammonium carbonate.

This method of the present invention does not specifically restrict the concentration of zirconyl ammonium carbonate. The production of the zirconia sol is attained economically advantageously when this concentration is higher than when it is lower. With due respect to the satability of the aqueous solution of zirconyl ammonium carbonate to withstand aging, however, the concentration is desired to be in the range of 10 to 25% by weight as $ZrO_2$.

The amount of the chelating agent to be used in the present method is the same as in the method resorting to hydrolysis of zirconyl ammonium carbonate. To be specific, it is preferable to be selected so that the chelating agent (mol number)/zirconia(mol number) is in the range of 0.02/1 to 4/1, preferably 0.1/1 to 3/1, and more preferably 0.5/1 to 2/1.

If the amount of the chelating agent to be used is unduly small, organic zirconium salts of certain type formed by the reaction of the zirconyl ammonium carbonate with the chelating agent, on being hydrolyzed by the method of this invention, exhibits the same behavior as when zirconyl ammonium carbonate is subjected all by itself to hydrolysis. Thus, the hydrolysis can be continued no longer and the use of the chelating agent is effectless. Conversely, if the amount exceeds 4/1, the chelating agent is used uneconomically because the effect thereof is not proportionately increased.

For the present method, it suffices to perform the hydrolysis at a temperature above 60° C. This reaction is accelerated when it is performed in an atmosphere of increased pressure. The practical reaction temperature is in the range of 60° to 300° C., preferably 90° to 120° C.

Since the zirconia sol obtained by the method of this invention is stabilized with the chelating agent, it is characterized by exhibiting outstanding stability to withstand agent even when it is concentrated to a high degree or when it is combined with a metal seed other than zirconium for the preparation of a zirconia type sol. When the reaction solution resulting from the hydrolysis is subjected to filtration and washing by the use of an ultrafiltration membrane, it can be washed efficiently even in a highly concentrated state. By the use of the ultrafiltration membrane, the concentration of the sol can be increased up to 35% by weight as $ZrO_2$. The reaction solution resulting from the hydrolysis and the sol purified to a high concentration by the use of the ultrafiltration membrane can be easily concentrated further by the conventional heat treatment. Thus, the zirconia sol can be obtained as concentrated to a level of about 45% by weight as $ZrO_2$.

The zirconia type sol can be prepared by adding the salt or sol of a metal other than zirconium to the zirconia sol obtained as described above. It is put to use optionally in a concentrated state or diluted state. The metal seed to be added to the zirconia type sol and the functions fulfilled thereby are the same as those in the zirconia type sol obtained from the aqueous solution of zirconyl ammonium carbonate described above.

The zirconia sol obtained by the present method can be transformed into a powder of zirconia sol particles by being dried at a temperature above 80° C. This powder can be reverted to a transparent zirconia sol by being dissolved in a liquid such as water or an organic solvent. This property is particularly useful for the purpose of transforming a sol in an aqueous solvent into a sol in an organic solvent as successfully attained in the case of the sol produced by the present invention. Generally where a sol is used as combined with a coating agent or an organic polymeric compound, the sol is required more often than not to be used as dissolved in water, the displacement of the water with an organic solvent is attained by adding the organic solvent to the aqueous sol and distilling the resultant mixture by heating or filtering the mixture with an ultrafiltration membrane thereby expelling the water as a distillate or a filtrate. As compared with this method, the method of the present invention is advantageous in respect that the operation is simple and the water content in the sol can be lowered to a greater extent because of the displacement with the organic solvent.

The zirconia sol having the chelating agent incorporated in the zirconia sol obtained by the hydrolysis of an aqueous solution of zirconyl ammonium carbonate as the starting material and the zirconia sol obtained by the hydrolysis of the reaction product of zirconyl ammonium carbonate with the chelating agent are invariably a transparent zirconia sol having a weakly alkaline to neutral pH value. Even when they are used at a pH value in the range of 6 to 14, they induce no gelation and retain hightly satisfactory stability for a long time.

The above mentioned zirconium silicate sol can be prepared by a method by coprecipitating an aqueous solution containing a zirconium salt and an organic silicon compound or silica sol with an alkali or a method by heating an aqueous solution containing a zirconium salt and an organic silicon compound or silica sol under normal or increased pressure to form sol.

Although as a method for coating the and/or gas inlet side leading end part of the monolithically structured catalyst with the zirconia sol and/or zirconium silicate sol, there can be cited impregnation method, coating method, spraying method, etc., it may be selected appropriately depending on the gas inlet side leading end part of the monolithically structured catalyst i.e., length of the part to be enhanced. For example, if the length of the part to be treated is not more than 10 mm, coating method and spraying method are preferable, but if it is more than 10 mm, impregnating method may be preferable. Further, although the length of the part to be enhanced is decided appropriately depending on the object of the use, it is sometimes sufficient to coat the leading end face at the gas inlet side, so the "leading end part" may contain the "leading end face" in the present invention.

Although an amount of the zirconia sol and/or zirconium silicate sol to be coated on the monolithically structured catalyst may be decided appropriately considering a degree of enhancement depending on the object of the use, it is usually 30 to 70% by weight, preferably 40 to 40% by weight based on the weight of the coated part of the catalyst. Further, the coating amount as zirconia and/or zirconium silicate is 1 to 35% by weight, preferably 5 to 20% by weight based on the weight of the coated part of the catalyst.

The monolithically structured catalyst can be further increased in abration strength by incorporating the zirconia sol and/or zirconium silicate sol with a tungsten compound and coating the resultant mixture on the monolithically structured catalyst and the object of the present invention can be more effectively attained.

As the tungsten compound, ammonium salt, oxalate, halide, sulfate, or nitrate thereof can be used. The tungsten compound is used as an aqueous solution of the above mentioned salt by mixing with zirconia sol and/or zirconium silicate sol.

An amount of the tungsten compound to be added is not more than 50% by weight, preferably 1 to 20% by weight based on the weight of zirconia ($ZrO_2$) or zirconium silicate ($ZrSiO_4$). If it is more than 50% by weight, it is unpreferable because of rather decrease of abration strength of the monolithically structured catalyst.

The aimed reinforced catalyst can be obtained by coating the gas inlet side leading end of the monolithically structured catalyst with the zirconia sol and/or zirconium silicate sol, optionally containing the tungsten compound, drying and calcining the coated catalyst. In such case, although the calcination temperature is not limited, it is usually 100° to 500° C., preferably 300° to 450° C.

The kind of the waste gas to be treated with the monolithic catalyst of this invention is not specifically defined. The monolithic catalyst of the present invention can be used for the removal of nitorgen oxides contained in waste gases discharged from boilers, heating furnaces, gas turbines, diesel engines, and various industrial processes.

Specifically, it can be effectively used for a waste gas approximately containing 0 to 3,000 ppm of sulfur oxides ($SO_x$), 1 to 20% by volume of oxygen, 1 to 15% by volume of carbon dioxide, 5 to 15% by volume of steam, 0.1 to 30 g/$Nm^3$ of soot, and 100 to 1,000 ppm of nitrogen oxides ($NO_x$, mainly NO). The waste gas from the ordinary boiler has a gas composition falling in the aforementioned ranges. The monolithic catalyst of the present invention can be also used for the treatment of such special gases as nitrogen oxides-containing waste gases containing no sulfur oxide and nitrogen oxides-containing waste gases containing halogen compounds.

Though the conditions of the treatment are variable with the kind, behavior, etc. of a given waste gas, the monolithic catalyst is generally used in an amount in the range of 0.5 to 3 parts by volume, preferably 0.5 to 1.1 parts by volume, based on 1 part by volume of ammonia ($NH_3$). In the case of a waste gas from a boiler, for example, since the $NO_x$ is formed mostly of NO, the molar ratio of NO to $NH_3$ is desired to be approximately in the range of 1:1. This is because the otherwise possible release of any excess $NH_3$ in its unaltered form into the ambient air must be avoided. Where the occurrence of unaltered $NH_3$ must be curbed to the fullest possible extent, it is desirable to lower the molar ratio of $NH_3/NO_x$ below 1:1.

For the purpose of decreasing the pressure loss, the flow speed of the waste gas is desired to be as low as permissible. If the flow speed is less than 1 Nm/sec (per apparent cross-section of the catalyst), however, the undesirability arises that the catalyst bed is clogged with soot or dust contained in the wast gas. From the practical point of view, therefore, the flow speed of the waste gas is suitably selected in the range of 1 to 20 Nm/sec (per apparent cross-section of the catalyst), preferably 2 to 10 Nm/sec (per apparent cross-section of the catalyst). The flow speed in this range is preferable because the low pressure loss aimed at by the present invention can be obtained. The reaction temperature is generally in the range of 200° to 700° C., preferably 250° to 600° C. The special velocity is generally in the range of 1,000 to 100,000 $hr^{-1}$, preferably 3,000 to 20,000 $hr^{-1}$. Though the pressure is not specifically defined, it is preferable to be in the range of 0.01 to 10 kg/cm², preferably 0.5 to 2 kg/cm². The type of the reaction vessel is not specifically defined. Generally, there may be used reaction vessels of the fixed-bed type.

Now, the present invention will be described more specifically below with reference to working examples.

EXAMPLE 1

TiO₂-SiO₂ was prepared by the following procedure.

As a titanium source, the aqueous sulfuric acid solution of titanyl sulfate having the following composition was used.

| | |
|---|---|
| TiOSO₄ (as TiO₂) | 250 g/liter |
| Whole H₂SO₄ | 1,100 g/liter |

Separately, 715 liters of aqua ammonia (NH₃, 25%) was added to 1,000 liters of water and 60 kg of an aqueous 30 wt% silica sol solution was further added thereto. To the resultant solution, a titanium-containing aqueous sulfuric acid solution prepared in advance by diluting 382 liters of the aforementioned aqueous sulfuric acid solution of titanyl sulfate with 750 liters of water was gradually added dropwise while the resultant solution was kept stirred, to induce formation of a co-precipitated gel. The resultant reaction mixture was left standing at rest for 15 hours.

The TiO₂-SiO₂ gel consequently obtained was separated by filtration, washed with water, dried, and fired in the open air at 550° C. for 6 hours.

The powder thus obtained and a solution containing ammonium metavanadate and ammonium paratungstate added thereto in combination with a molding auxiliary were thoroughly mixed in a suitable amount of water by means of a kneader. The resultant mixture was kneaded and molded in the form of a grating of the square of 150 mm by means of an extrusion molding device. The molded grating was dried and fired at 470° C. for 5 hours, to produce an integrally constructed catalyst.

The V₂O₅ and WO₃ contents of the produced catalyst were 2% by weight and 7% by weight respectively. In the honeycomb-like catalyst, the throughholes had an equivalent diameter of 6 mm the cell wall had a thickness of 1.4 mm, and the specific surface area of 130 m²/g.

Separately, 13,000 g of a commercially available aqueous ammonium zirconyl carbonate solution having a zirconyl carbonate content of 13% by weight as ZrO₂ was placed in a flask having an inner volume of 10 liters. The solution was kept stirred and 1,040 g of glycolic acid was gradually added thereto. During the addition, the reaction system evolved an odorless gas. Then, the flask was heated by means of a mantle heater to effect hydrolysis of the solution. The reaction solution started emanating a gas of an ammoniacal odor at a solution temperature of 50° to 60° C. and, on further elevation of the temperature, started vigorous effervescence, with the result that the reaction proceeded with expulsion from the system of gases such as ammonia and carbon dioxide which originated in unnecessary ions in the sol. The effervescence subsided after the reaction continued at a temperature of about 100° C. for about three hours. The flask was properly replenished with purified water and, at the same time, heated continuously for 12 hours, to produce zirconia sol having a concentration of 15% by weight as ZrO₂, a pH value of 7, and an average particle diameter of 60 Å.

Then, a reinforced catalyst aimed at was prepared by cutting a portion of 7×7 cells×150 mm in length from the catalyst obtained as previously described, immersing the portion to a length of 50 mm from the terminal face thereof in the aforementioned zirconia sol (having a zirconia content of 15% by weight as ZrO₂) for 5 minutes, drying the partly impregnated portion at 150° C. for 5 hours, and calcining the dry portion at 400° C. for 3 hours. In the renforced catalyst, coated amount of zirconia was 6% by weight based on the coated part of the catalyst.

EXAMPLE 2

A reinforced catalyst having the gas inlet side leading end part of a monolithically structured catalyst coated with zirconium silicate sol was prepared by following the procedure of Example 1, except that a zirconium silicate sol (having a zirconium silicate content of 15% by weight as ZrSiO₄) prepared by the following procedure was used in the place of zirconia sol. In the reinforced catalyst, coated amount of zirconium silicate was 6% by weight based on the coated part of the catalyst.

(Preparation of Zirconium Silicate Sol)

Three (3) kg of an aqueous zirconium nitrate solution (having a zirconium nitrate content of 18% by weight as ZrO₂), 0.3 kg of urea, and 0.877 kg of silica sol (having a silica content of 30% by weight as SiO₂; produced by Nissan Chemicals Industries, Ltd. and marketed under trademark designation of "Snowtex") were mixed and 10 liters of purified water was added thereto. The resultant aqueous solution was boiled for 6 hours, to yield a zirconium silicate sol. This sol was cooled and passed through an ultrafiltration device to produce a zirconium silicate sol having a zirconium silicate content of 15% by weight as ZrSiO₄ having 100 Å of an average particle diameter.

EXAMPLE 3

A tungsten-containing zirconia sol having a composition ratio of ZrO₂:WO₃ 9:1 (by weight) was prepared by adding 40 ml of an aqueous 10% monoethanolamine solution containing 7.76 g of ammonium paratungstate to 400 g of the same zirconia sol (having a zirconia content of 15% by weight as ZrO₂) as used in Example 1.

Then, a reinforced catalyst was obtained by following the procedure of Example 1, except that the aforementioned tungsten-containing zirconia sol was used in the place of zirconia sol.

EXAMPLE 4

A tungsten-containing zirconium silicate sol having a composition ratio of ZrSiO₄:WO₃=9:1 (by weight) was prepared by following the procedure of Example 3, except zirconium silicate sol (having a zirconium silicate content of 15% by weight as ZrSiO₄) was used in the place of zirconia sol.

Then, a reinforced catalyst was obtained by following the procedure of Example 1, except that the aforementioned tungsten-containing zirconium silicate sol was used in the place of zirconia sol.

EXAMPLE 5

A reinforced catalyst having the gas inlet side leading end part of a monolithically structured catalyst coated with zirconia sol was prepared by following the procedure of Example 1, except that a zirconia sol was prepared by the following procedure was used. In the reinforced catalyst, coated amount of zirconia was 12% by weight based on the coated part of the catalyst.

(Preparation of Zirconia Sol)

In 200 liters of purified water, 30 kg of an aqueous zirconium nitrate solution containing 18% by weight of $ZrO_2$ and 3 kg urea were dissolved. Then, the resultant aqueous solution was heated to 120° C. to produce a transparent zirconia sol. This sol was cooled and then concentrated with an ultrafiltration device to 10% by weight ass $ZrO_2$. Subsequently, the concentrated sol was maintained in a vacuum at a temperature not exceeding 50° C. and thermally concentrated at a temperature of 35° C., to obtain a transparent zirconia sol having a concentration of 25% by weight and exhibiting lasting stability. The sol thus obtained had a pH value of not more than 1 and an average particle diameter of 20 Å.

EXAMPLE 6

A reinforced catalyst having the gas inlet side leading end part of a monolithically structured catalyst coated with zirconia was prepared by following the procedure of Example 1, except that a commercially available zirconia sol (product of Nissan Chemical Industries, Ltd., having a zirconia content of 30% by weight as $ZrO_2$) was used. In the reinforced catalyst, coated amount of zirconia was 14% by weight.

Control 1

A reinforced catalyst was obtained by following the procedure of Example 1, except that silica sol (having a silica content of 15% by weight; produced by Nissan Chemicals Industries, Ltd. and marketed under trademark designation of "Snowtex") was used in the placed of zirconia sol.

Control 2

A reinforced catalyst was obtained by following the procedure of Example 1, except that a commercially available titania sol (having a zirconia content of 10% by weight as $TiO_2$; produced by Ishihara Sangyo Co., Ltd. and marketed under trademark designation of "US-200") was used in the placed of zirconia sol.

EXAMPLE 7

The catalysts of Examples 1 to 6 and Controls 1 to 2 and the monolithically structured catalyst prepared in Example 1 and not subjected to the reinforcing treatment were tested for ratio of wear and for removal ratio of nitrogen oxides by the procedures descried below. The results are shown in Table 1.

(Determination of Ratio of Wear)

Reinforced portions (7×7 cells×50 mm in length) cut severally from the catalysts were used as testing catalyst samples. The air containing lime fly ash in a concentration of 50 g/m³ was introduced at a flow rate of 35 m/sec (per apparent cross-section of the catalyst) into the through holes of the catalyst samples at normal room temperature for 30 minutes. Then, the sample catalysts were subjected to forced wear test. The ratios of wear were calculated in accordance with the following formula.

Ratio of wear (%) = [{(Weight of catalyst before test) − (Weight of catalyst after test)}/(Weight of catalyst before test)] × 100

(Removal Ratio of Nitrogen Oxides)

Testing catalyst samples (3×3 cells×150 mm in length) obtained in the same manner as described above were immersed infused salt. The resultant impregnated samples were each placed to pack a reaction tube of stainless steel 38.8 mm in inside diameter. A synthetic gas of the following composition was introduced into the reaction tube. The inlet and outlet gases of the reaction tube were tested for NOx concentration by means of a chemical luminescence type NOx meter (produced by Yanagimoto Seisakusho and marketed under product code of "ECL-77A"). The ratios of denitrification of the samples were calculated in accordance with the following formula.

Ratio of denitrification (%) = [{(Inlet NOx concentration) − Outlet NOx concentration)}/(Inlet NOx concentration)] × 100

| Conditions of reaction gas | |
|---|---|
| Temperature | 380° C. |
| Spatial velocity | 10.000 hr$^{-1}$ (STP) |
| $NH_3$/NOx mol ratio | 1.0 |
| Gas composition | |
| NOx | 500 ppm |
| $O_2$ | 4% |
| $SO_2$ | 200 ppm |
| $H_2O$ | 10% |
| $N_2$ | Balance |

TABLE 1

| | Ratio of wear | Removal ratio of nitrogen oxide (%) |
|---|---|---|
| Example | | |
| 1 | 5 | 78 |
| 2 | 5 | 78 |
| 3 | 4 | 79 |
| 4 | 4 | 79 |
| 5 | 6 | 78 |
| 6 | 8 | 78 |
| Control | | |
| 1 | 10 | 74 |
| 2 | 20 | 75 |
| No treatment | 25 | 80 |

It is clearly noted from the results of Table 1 that the catalysts of this invention exhibited conspicuously improved wear-resisting strength and yet possessed of virtually the same catalytic activity as the untreated catalyst.

What is claimed is:

1. A waste gas-treating catalyst produced by coating the gas inlet side leading end part of an integrally formed titanium-containing porous nitrogen oxide removing catalyst with at least one sol selected from the group consisting of zirconia sol and zirconium silicate sol, drying and/or calcining the coated catalyst.

2. A catalyst according to claim 1, wherein an average particle diameter of said sol is not more than 400 Å.

3. A catalyst according to claim 2, wherein an average particle diameter of said sol is 20 to 400 Å.

4. A catalyst according to claim 1, wherein said zirconia sol is at least one member selected from the group consisting of acidic zirconia sol and neutral to basic zirconia sol.

5. A catalyst according to claim 1, wherein said zirconia sol or zirconium silicate sol contains a tungsten compound.

6. A catalyst according to claim 1, wherein said sol accounts for a proportion in the range of from 30 to 70% by weight, based on the weight of the coated portion of said catalyst.

7. A catalyst according to claim 1, wherein said sol accounts for a proportion in the range of 1 to 35% by weight calculated as zirconia or zirconium silicate in said sol, based on the weight of the coated portion of said catalyst.

8. A catalyst according to claim 5, wherein the amount of said tungsten compound in said sol is not more than 50% by weight, based on the amount of zirconia in said zirconia sol and/or zirconium silicate in zirconium silicate sol.

9. A catalyst according to claim 1, wherein the catalytically active substance of said catalyst is composed of (A) 60 to 99.5% by weight of a binary oxide containing titanium and silicon and (B) 40 to 0.5% by weight of the oxide of at least one metal selected from the group consisting of vanadium, tungsten, molybdenum, copper, manganese, cerium, and tin.

10. A catalyst according to claim 9, wherein said titanium accounts for a proportion in the range of from 40 to 95 atomic percent and said silicon for a proportion in the range of from 60 to 5 atomic percent.

11. A catalyst according to claim 1, wherein the specific surface area of said monolithically structured catalyst is not less than 80 m$^2$/g.

12. A catalyst according to claim 1, wherein said monolithically structured catalyst is a honeycomb catalyst.

13. A catalyst according to claim 12, wherein the diaphragms separating the throughholes in said honeycomb catalyst have a wall thickness in the range of from 0.3 to 2.0 mm.

14. A catalyst according to claim 9, wherein the holes in said honeycomb catalyst have diameters in the range of from 3 to 10 mm.

15. A catalyst according to claim 1, wherein said zirconia sol is an acidic zirconia sol.

16. A catalyst according to claim 12, wherein said acidic zirconia sol is a transparent zirconia sol obtained by heating the aqueous solution of a zirconium salt in the presence of urea.

17. A catalyst according to claim 15, wherein said acidic zirconia sol is a highly concentrated zirconia sol obtained by heating the aqueous solution of a zirconia salt in the presence of urea and subjecting the resultant transparent zirconia sol to ultrafiltration.

18. A catalyst according to claim 15, wherein said acidic zirconia sol is a highly concentrated zirconia sol obtained by heating the aqueous solution of a zirconia salt in the presence of urea, subjecting the resultant transparent zirconia sol to ultrafiltration, and thermally concentrating the resultant concentrated zirconia sol at a temperature of not higher than 80° C.

19. A catalyst according to claim 15, wherein said acidic zirconia sol is a zirconia sol obtained by heating the aqueous solution of a zirconium salt in the presence of urea, subjecting the resultant transparent zirconia sol to ultrafiltration, thermally concentrating the produced concentrated zirconia sol at temperature of not higher than 80° C., and combining the highly concentrated zirconia sol with at least one compound selected from the group consisting of chelating agents and compounds of metals other than zirconium.

20. A catalyst according to claim 1, wherein said zirconia sol is neutral or basic zirconia sol.

21. A catalyst according to claim 20, wherein said neutral or basic zirconia sol is a zirconia sol obtained by hydrolyzing ammonium zirconyl carbonate and combining the resultant transparent zirconia sol with a chelating agent.

22. A catalyst according to claim 20, wherein said neutral or basic zirconia sol is a zirconia sol obtained by hydrolyzing the reaction product of ammonium zirconyl carbonate with a chelating agent.

23. A catalyst according to claim 17, wherein said neutral or basic zirconia sol is an organic solvent-dispersed zirconia sol obtained by combining a water-dispersible zirconia sol with an organic solvent and substituting water for the organic solvent in the resultant mixture.

24. A catalyst according to claim 21, wherein the amount of said chelating agent to be used is such that the ratio of chelating agent (number of mols)/zirconia (number of mols) falls in the range of from 0.02/1 to 4/1.

25. A catalyst according to claim 22, wherein the amount of said chelating agent to be used is such that the ratio of chelating agent (number of mols)/zirconia (number of mols) falls in the range of 0.02/1 to 4/1.

* * * * *